E. KEMPSHALL.
PAD FOR HORSES' HOOFS.
APPLICATION FILED JAN. 7, 1916.
1,198,927.
Patented Sept. 19, 1916.
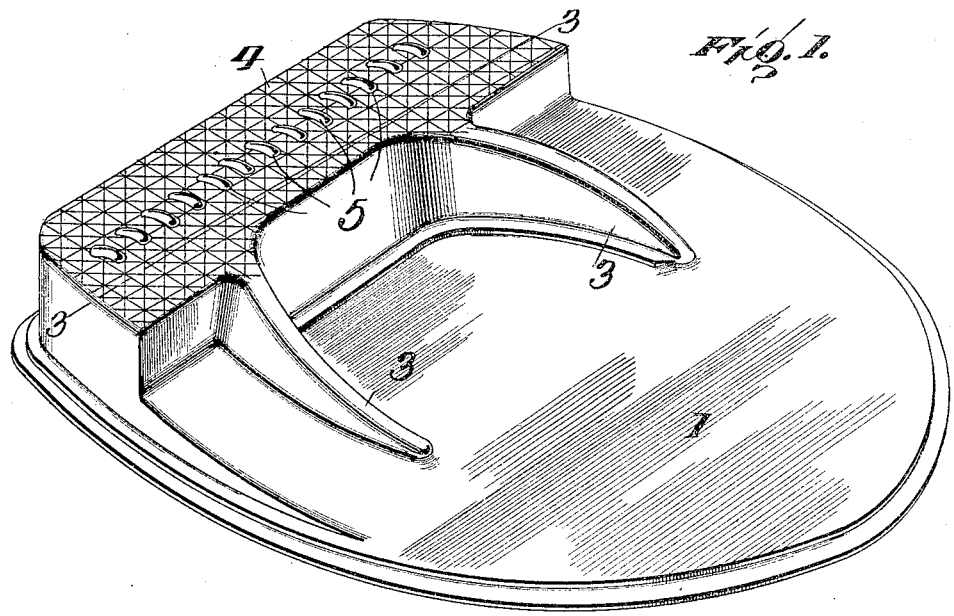
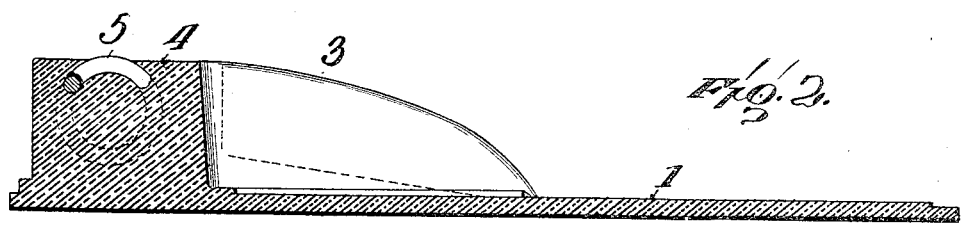
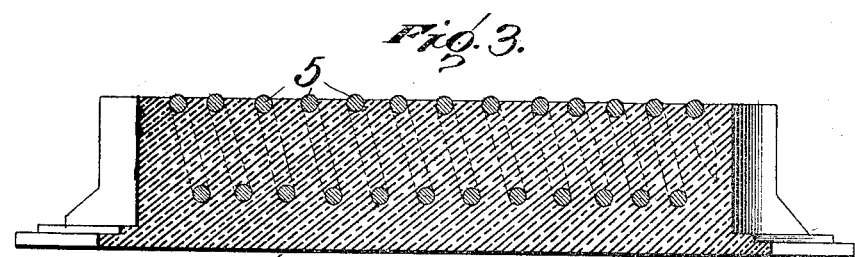
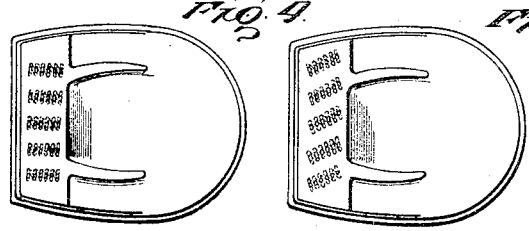
Inventor
E. Kempshall
by
Jno. Imirie
Attorney

UNITED STATES PATENT OFFICE.

ELEAZER KEMPSHALL, OF WASHINGTON, DISTRICT OF COLUMBIA.

PAD FOR HORSES' HOOFS.

1,198,927.  Specification of Letters Patent.  Patented Sept. 19, 1916.

Application filed January 7, 1916. Serial No. 70,840.

*To all whom it may concern:*

Be it known that I, ELEAZER KEMPSHALL, a citizen of the United States, residing at Washington, in the District of Columbia, have invented certain new and useful Improvements in Pads for Horses' Hoofs, of which the following is a specification.

This invention relates to a pad for a horse's hoof designed primarily to prevent slipping.

The object of the invention is to provide a pad, the surface of which is so constructed as to assist an animal in gripping the surface to prevent slipping.

The invention also comprehends improvements in the details of construction and arrangement of parts which will be hereinafter described and particularly pointed out in the appended claims.

In the accompanying drawing: Figure 1 is an inverted perspective view of a pad constructed in accordance with my invention. Fig. 2 is a central longitudinal section on the line 2—2 of Fig. 1. Fig. 3 is a transverse section on the line 3—3 of Fig. 1. Figs. 4 and 5 illustrate further forms of the invention.

In the accompanying drawing the same numerals refer to like parts in all the figures.

1 indicates a pad or base formed of rubber and canvas, and is of usual construction. Integrally formed at one end of the base is a transverse projecting portion 2, and extending therefrom are ribs 3, which merge into the base. The transverse projecting portion is formed of rubber or like material and may be suitably reinforced, and its outer surface is roughened, as shown at 4.

My invention relates specifically to the means employed for providing a substantial and positive anti-slipping element, which is embedded in the transverse projecting portion, and which coöperates with the surface 4.

In the preferred embodiment of my invention, a section of a coil spring 5, is embedded in the transverse projecting portion, the outer surface of the various coils being flush with the outer roughened surface 4, of the transverse projecting portion, the ends of the spring terminating some distance from the opposite end walls of the transverse projecting portion.

The coil spring extends transversely of the pad, as shown, and by reason of the rubber forming the projecting portion filling the interstices of the spring, the latter is substantially anchored and forms practically a unit with the transverse portion and cannot become displaced, owing to the large number of coils and the rubber filling the spaces between said coils. By transversely arranging the spring in the projecting portion, a plurality of spaced elongated wearing surfaces are provided on the surface of the projecting portion, said surfaces being arranged at an angle to a line drawn longitudinally through the pad, thereby adding to the gripping quality to prevent slipping.

The metal anti-slipping element may be constructed in other ways so as to provide the anti-slipping surface desired, and may or may not be formed of spring metal. However by making the metal resilient, and particularly in the form shown in the drawing, when pressure is applied, the spring yields with the rubber and prevents the parts becoming separated and adds to the anti-slipping feature of the invention. For this reason it has been found preferable to arrange the spring transversely of a line drawn longitudinally through the pad.

It is obvious I may embed a plurality of short springs in the transverse projection, same being substantially parallel with a longitudinal line drawn through the center of the pad, as shown in Fig. 4. In this form of the invention I may arrange the short springs at an angle to a line drawn through the center of the pad, as shown in Fig. 5.

The invention is extremely simple and is effective in operation, and positively insures against slipping.

What I claim is:—

1. A non-skid pad for a horse's hoof comprising a base of resilient material formed with a resilient transverse projection adjacent which the ends of a shoe are adapted to fit, and a transversely arranged spring embedded in the transverse projection, the outer surfaces of the coils of the spring being flush with the surface of the projecting portion.

2. A non-skid pad for a horse's hoof comprising a resilient base provided with a resilient transverse projection and having two ribs spaced from the ends of the projection and integral therewith and the base, the ribs acting to brace the projection, the inner surfaces of a shoe being adapted to engage the outer surfaces of said ribs, and a transversely arranged spring embedded in the transverse projection, the ends of the said spring terminating some distance inside the ends of the projections and the outer surfaces of the coils being flush with the surface of the projection.

3. A non-skid pad for a horse's hoof comprising a base of resilient material formed with a resilient transverse projection against which the ends of a shoe are adapted to fit, a transversely arranged plurality of coils formed of a continuous piece of metal embedded in the projection and terminating adjacent the ends of said projection, the outer surfaces of the coils being flush with the outer surface of the projection.

In testimony whereof I affix my signature in the presence of two witnesses.

ELEAZER KEMPSHALL.

Witnesses:
EMILY F. CAMP,
JNO. IMIRIE.

Copies of this patent may be obtained for five cents each, by addressing the "Commissioner of Patents, Washington, D. C."